United States Patent [19]

Peterson et al.

[11] Patent Number: 4,522,026

[45] Date of Patent: Jun. 11, 1985

[54] POWER/TORQUE LIMITER UNIT FOR FREE TURBINE TYPE ENGINES

[75] Inventors: Gudmundur P. Peterson, Mont St. Hilaire; Daniel d'Anjou, Montreal, both of Canada

[73] Assignee: Pratt & Whitney Canada Inc., Longueuil, Canada

[21] Appl. No.: 464,402

[22] Filed: Feb. 7, 1983

[51] Int. Cl.³ .............................................. F02C 9/28
[52] U.S. Cl. .................. 60/39.281; 60/39.282
[58] Field of Search .............. 60/39.281, 39.282; 73/862, 862.28

[56] References Cited

U.S. PATENT DOCUMENTS

| | | | |
|---|---|---|---|
| 3,106,062 | 10/1963 | Rosenberg | 73/862 |
| 3,420,056 | 1/1969 | Eames | 60/39.281 |
| 3,851,463 | 12/1974 | Robinson | 60/39.282 |
| 4,008,567 | 2/1977 | Hirsch | 60/39.282 |
| 4,286,324 | 8/1981 | Ingram | 60/39.282 |

*Primary Examiner*—Louis J. Casaregola

*Attorney, Agent, or Firm*—Fleit, Jacobson, Cohn & Price

[57] ABSTRACT

The disclosure teaches an improvement in a free turbine type engine which comprises a power limit unit. The unit includes a first sensor for measuring pressure at the turbine inlet, and a second sensor for measuring temperature at the turbine inlet. A third means provides a measurement indicative of turbine exhaust pressure and may be a sensor located in the exhaust duct which is downstream of the turbine or may comprise means for providing outside ambient pressure readily available from existing aircraft instrumentation, e.g., altimeter. A processor means calculates shaft horse power (SHP) from the above measurements. Other means are provided for generating a reference signal, and the reference signal is compared with SHP. When SHP is greater than the reference signal, then fuel to the engine is controlled to reduce engine power. The unit can also be adapted for calculating torque, and for reducing the torque when the torque is greater than the reference level. The invention also relates to a method for limiting power or torque using the above apparatus.

15 Claims, 3 Drawing Figures

POWER/TORQUE LIMITER UNIT FOR FREE TURBINE TYPE ENGINES

BACKGROUND OF INVENTION (a) Field of the Invention

The invention relates to improvements in a free turbine type engine. More specifically, the invention relates to such an engine including a power limiter unit.

(b) Description of Prior Art

It is known in the art to provide aircraft engines wherein temperature and pressure conditions are measured at different parts thereof. The data obtained from the measurement is used to calculate control signal levels for providing input to a control means for controlling different parameters of the engine. Such engines are illustrated in, for example, U.S. Pat. Nos. 2,808,702, D. A. Dotson, issued Oct. 8, 1957, 2,910,125, S. G. Best, issued Oct. 27, 1959, 3,019,604, W. M. Hall, issued Feb. 6, 1962, 3,420,056, K. Eames, issued Jan. 7, 1969, 3,421,317, A. Bedford, issued Jan. 14, 1969, 3,971,208, G. V. Schwent issued July 27, 1976, 4,275,557, I. E. Marvin et al, issued June 30, 1981, 2,667,228, Wood et al issued Jan. 26, 1954, 2,734,340, C. F. Wood, issued Feb. 14, 1956, 2,977,756, M. C. Stone, issued Apr. 4, 1961, 3,031,840, B. S. Hegg et al, issued May 1, 1962, 3,203,179, B. E. Blackaby, issued Aug. 31, 1965, 3,596,467, P. A. Avery, issued Aug. 3, 1971, 3,620,011, L. A. Urban et al, issued Nov. 16, 1971, 4,159,625, W. B. Kerr, issued July 3, 1979, 4,161,101, T. M. Drummond, issued July 17, 1979, 4,185,460, Moore et al, issued Jan. 29, 1980 and 4,242,864, Cornett et al, issued Jan. 6, 1981.

It is also known in the art to compare the calculated level with a reference level, and to provide the difference of the comparison to the input of the control means. Such an engine is illustrated in U.S. Pat. No. 3,420,056.

The general ideas above discussed are, thus, well known in the art. However, as can be seen from the study of the above references, improvements are possible in the specific locations for measuring temperature and pressure, in the specific mathematical manipulations to which the measured data is applied, and in the specific parameter which is then controlled by the calculated value.

It is also known that the traditional way of measuring power of turbo prop and turbo shaft engines is to measure the torque of the output shaft. This is accomplished by measuring the twist of the shaft or, in some cases, the torque is determined by means of measuring the reaction of a helical ring gear that has its axial reactive mode opposed by a hydraulic cylinder. The level of pressure in the cylinder is directly proportional to the torque being fed through the gear box. The torque pressure is converted to an electrical signal that is properly conditioned to indicate torque on a suitable instrument on a control panel.

Although the latter system has proven to be reliable, it fails in fully aerobatic installations when the aircraft is flown in negative "g" conditions, i.e., upside down. This manoeuver will result in momentary loss or reduction of engine oil pressure, causing the hydraulic torque signal to fall below the true value, thus resulting in power fluctuations in installations which incorporate torque limiters or torque controllers.

In order to overcome this difficulty, it is necessary to provide an engine wherein the control signal for power or torque limiting is provided without measuring the power or torque directly.

SUMMARY OF INVENTION

It is therefore an object of the invention to provide an engine which overcomes the above difficulties.

It is a more specific object of the invention to provide an engine wherein the control signal for power or torque limiting is provided without measuring the power or torque directly.

It is an even more specific object of the invention to provide an engine wherein power is determined by measuring pressure and temperature at the inlet of the power turbine, and by providing a measurement indicative of exhaust pressure.

It is an even more specific object of the invention to convert the temperature and pressure measurements into appropriate electrical signals which are then fed into a computer pre-programmed to process this data to establish output shaft power.

It is an even more specific object of the invention to compare the calculated output shaft power with a reference signal to provide a control signal for a power limiter unit.

It is a further object of the invention to meet the above objectives with respect to torque.

In accordance with the invention there is provided, in a free turbine engine, which engine includes a power turbine having an inlet, an exhaust duct downstream of said turbine, an output shaft and a control valve for controlling engine power, the improvement comprising a power limiter unit. The unit includes a first sensor means for measuring pressure at the inlet, the first sensor means being disposed in the turbine inlet. A second sensor means is provided for measuring temperature at the inlet, the second sensor means being disposed in the turbine inlet. A third sensor means measures turbine exhaust pressure, the third pressure means being disposed in the duct or tapped off the altimeter. Processor means are provided for calculating shaft horse power (SHP) from the measurements of the first, second and third sensor means. Means are provided for generating a reference signal, and comparator means are provided for comparing SHP with the reference signal, the comparator means having output means. The output means is connected to the control valve, whereby to reduce engine power when SHP is greater than the reference signal.

In accordance with a further embodiment there is provided, in a free turbine engine which engine includes a power turbine having an inlet, an exhaust duct downstream of the turbine, an output shaft and a control valve for controlling engine torque, the improvement comprising a torque limit unit. The unit includes a first sensor means for measuring pressure at the inlet, the first sensor means being disposed in the turbine inlet. A second sensor means is provided for measuring temperature at the inlet, the second sensor means being disposed in the turbine inlet. Third sensor means are provided for measuring turbine exhaust pressure, the third sensor means being disposed in the duct or tapped off the altimeter. Fourth sensor means are provided for measuring RPM of the turbine. Processors are provided for calculating torque from the measurements of the first, second, third and fourth sensor means, and means are provided for generating a reference signal. Comparator means compare calculated torque with the reference signal, the comparator means having output means. The output means are connected to the control valve, whereby to reduce engine torque when the calculated torque is greater than the reference signal.

From a different aspect, and in accordance with the invention, there is provided, in a free turbine type engine, which engine includes a power turbine having an inlet, an exhaust duct downstream of the turbine, an output shaft and a control valve for controlling engine power, the method of limiting power. The method includes the steps of measuring the pressure at the turbine inlet and measuring the temperature at the turbine inlet. The method also includes steps of measuring the turbine exhaust pressure in the duct and calculating shaft horse power (SHP) from the above measurements. A reference signal is generated, and the measured SHP is compared with the reference signal. Engine power is reduced when SHP is greater than the reference signal.

In accordance with a further aspect, there is provided in accordance with the invention, a free turbine type engine, which engine includes a power turbine having an inlet, an exhaust duct downstream of the turbine, an output shaft and a control valve for controlling engine torque, the method of limiting torque. The method comprises measuring the pressure at the turbine inlet and measuring the temperature at the turbine inlet. The turbine exhaust pressure is measured in the duct, and RPM of the turbine is also measured. Torque is calculated from the above measurements, and a reference signal is generated. The measured torque is compared with the reference signal, and engine torque is reduced with the measured torque is greater than the reference signal.

BRIEF DESCRIPTION OF THE DRAWINGS

The invention will be better understood by an examination of the following description together with the accompanying drawings in which.

DESCRIPTION OF PREFERRED EMBODIMENTS

Figure 1:
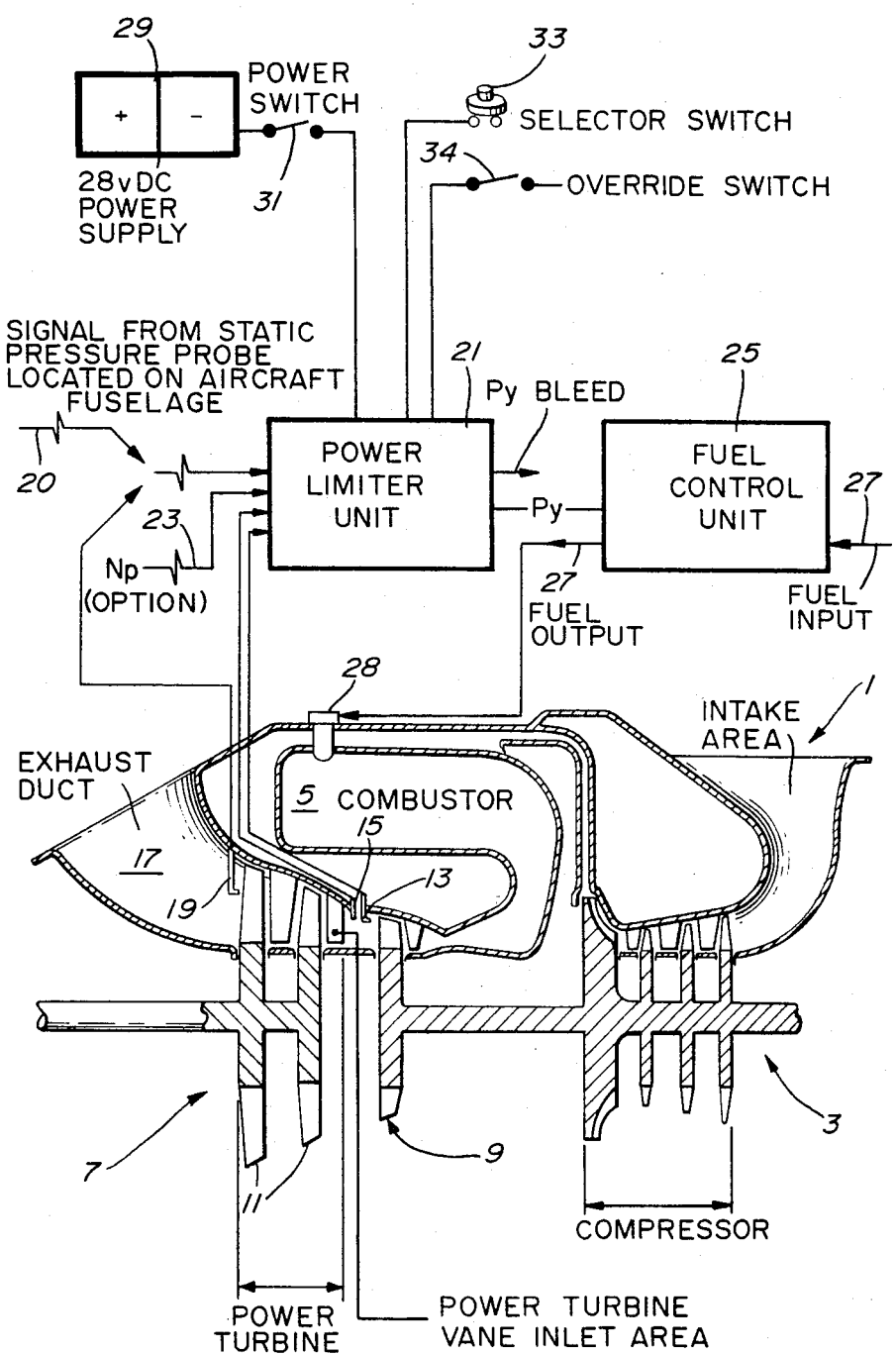
FIG. 1 is a somewhat schematic sectional diagram of a portion of a turbine engine showing the location of the pressure and temperature sensors and illustrating the entire system for a power/torque limiting.

Referring now to FIG. 1, the turbine engine in accordance with the invention includes an intake duct 1, a compressor section 3, a combustor 5, and a turbine section 7. The turbine section includes a compressor turbine 9 and a power turbine 11. Disposed at the power turbine inlet are a pressure sensor 13 and temperature sensor 15. The turbine section also includes an exhaust duct 17, and a pressure sensor 19 is disposed in the exhaust duct downstream of the power turbine. Instead of using the pressure measured by 19, outside ambient pressure can be used. This would be provided by a static pressure sensor located on the aircraft fuselage and brought in on line 20 of FIG. 1, i.e. the sensor used by the aircraft altimeter. The ambient pressure approximates the turbine exhaust pressure. The choice of measuring turbine exhaust pressure directly or through the use of ambient pressure is dependent on the degree of precision required from the power/torque limiter. As can be seen, conductive means are provided for carrying the signals from the sensors to a power/torque limiter unit 21 which will be further described in association with FIG. 2. Line 23 carries a signal representative of the RPM of the power turbine to the power/torque limiter unit 21 for torque limiting calculations as will be seen below.

The limiter unit 21 reduces pressure $P_y$ which is the governing pressure of fuel control unit 25. Unit 25 is inserted in fuel line 27. The fuel line originates in a fuel supply container and terminates in fuel inlet means 28.

The limiter unit 21 is powered by a power supply 29. In the preferred embodiment of an aircraft, the power supply is a 28 volt DC battery. Power switch 31 is provided for turning the limiter unit 21 on or off. Selector switch 33 is provided for selecting one of two reference levels as will be discussed in association with FIG. 2. Override switch 34 is provided for overriding the effects of power limiter unit 21 as will also be discussed in association with FIG. 2.

The power/torque of the engine can be determined from the data supplied by the above mentioned sensors in accordance with the following analysis:

It is known that for a free turbine type turbine engine the power turbine flow parameter remains constant at high power levels:

$$Q = \frac{W\sqrt{T}}{P1}$$

wherein:

Q = power turbine flow parameter which is constant and related to the turbine vane ring effective throat area;

W = the gas flow into the power turbine;

T = total temperature at the power turbine inlet; and

P1 = total pressure at the power turbine inlet.

As will be apparent, P1 and T are measured with sensors 13 and 15 respectively.

Power turbine efficiency and mechanical efficiency remain substantially constant over the normal operating range, i.e.:

$\eta_{pt}$ = constant $\eta_{mec}$ = constant

The basic power equation for the turbine engine is as follows:

$$SHP = \eta_{mec} W \eta_{pt} T C_p \left( 1 - \left( \frac{P2}{P1} \right)^{\frac{\gamma-1}{\gamma}} \right)$$

where;

SHP = shaft horse power $C_p$ = the specific heat of the gas

P2 = total pressure at the turbine exhaust duct i.e., the pressure measured by the sensor 19 or outside ambient pressure which is readily available from existing aircraft instrumentation, e.g., altemeter; and $\gamma$ = the ratio of specific heat of the gas.

Introducing Q into the above equation and then replacing Q, $\eta_{mec}$ and $\eta_{pt}$ by K1, and replacing Cp by K2 and replacing $(\gamma - 1/\gamma)$ by K3, the above equation reduces to:

$$SHP = K1\, K2\, P1\, \sqrt{T}\left(1 - \left(\frac{P2}{P1}\right)^{K3}\right)$$

In the above equation, Cp and γ are both related to temperature at the turbine inlet, so that, the factors K2 and K3 are not, strictly speaking, constants but are related to inlet temperatures. Accordingly, as will be seen below, T is used to form the factors K2 and K3.

The torque is calculated as follows:

$$\text{Torque} = SHP \times \frac{K4}{N_p}$$

where;
$N_p$=power turbine speed RPM; and
K432 constant.

Figure 2:
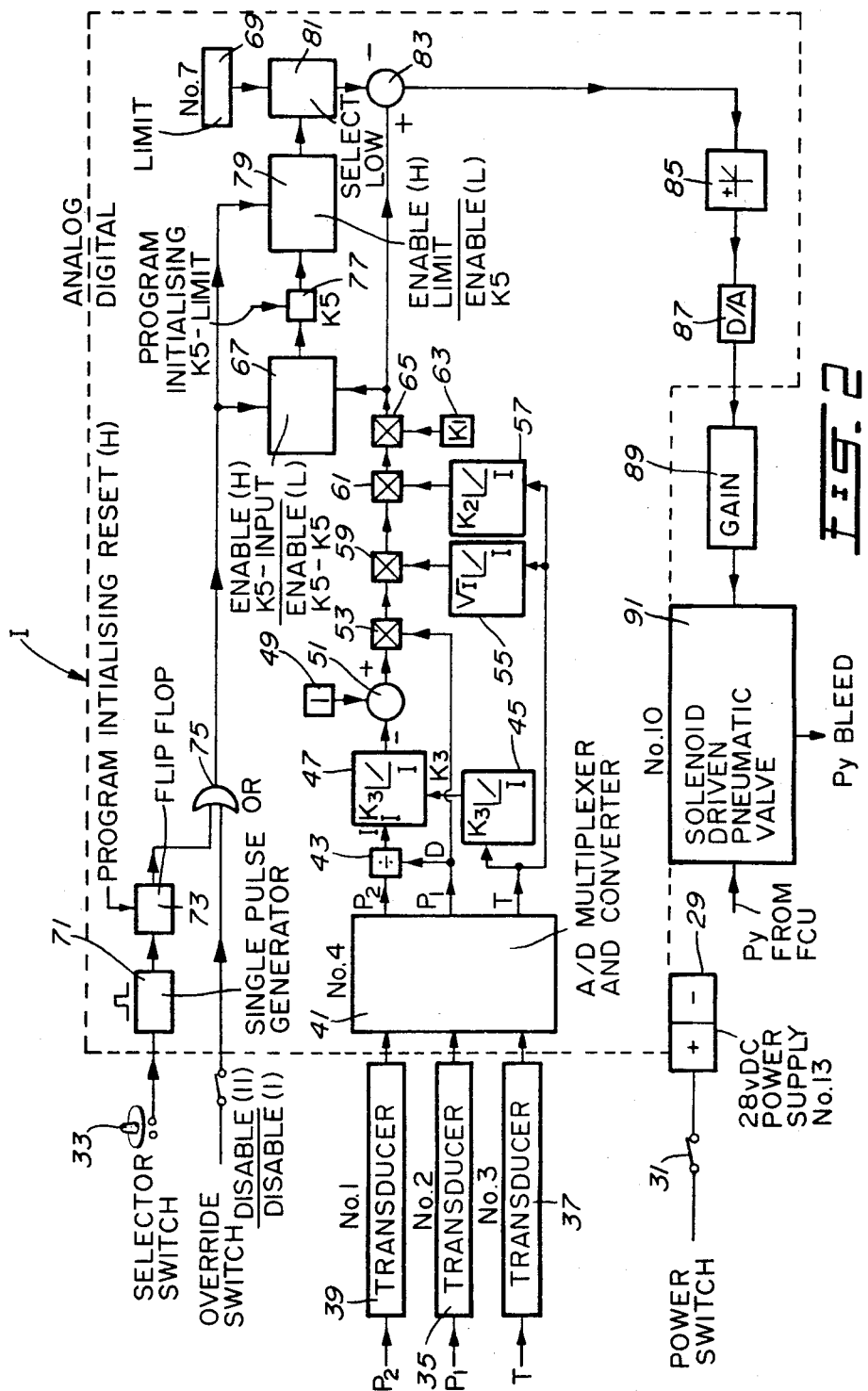
FIG. 2 illustrates, in block diagram form, an electronic system for performing the calculations and providing an output signal for power limiting.

Turning now to FIG. 2, there is illustrated a circuit for calculating SHP from the three measured quantities, and for calculating torque from the three measured quantities plus the measurement of RPM of the power turbine. The outputs of sensors 13, 15 and 19 are fed to transducers 35, 37 and 39 respectively. The transducers convert the outputs of the sensors to electrical analog signals, and the electrical analog signals are fed to an analog to digital converter and multiplexor 41. The output of the converter are digital signals representative of T, P1 and P2. The P1 and P2 outputs are fed to the input terminals of divider circuit 43 the output of which will be the ratio P2/P1. The output T is fed to function generator 45 which produces the function K3. The ratio P2/P1 and the function K3 are fed to function generator 47 whose output is $(P2/P1)^{K3}$.

Unity generator 49 presents the value 1 which is fed to the positive terminal of summer 51. The output of 47 is fed to the negative terminal thereof, so that the output of 51 is $(1-(P2/P1)^{K3})$.

The P1 output is also fed to one input terminal of multiplier 53 whose other terminal is fed from the output of 51 so that the output of 53 is $P1(1-(P2/P1)^{K3})$.

The output T is also fed to function generator 55, whose output is $\sqrt{T}$, and to function generator 57, whose output is K2. The output of 55 is fed to multiplier 59 whose other input is fed from 53, and the output of 59 is fed to 61 whose other input is 57. Thus, the output of 61 is $P1\sqrt{T}K2(1-(P2/P1)^{K3})$.

K1 generator 63 feeds the value of K1 to multiplier 65 whose other input is fed from the output of 61. Thus, the output of 65 is K1 K2 P1 $\sqrt{T}(1-(P2/P1)^{K3})$, i.e., the value for SHP.

The reference level to which SHP is compared can either be set at a particular power level setting, as will be discussed below, or it can be set at a single permanent value, such as take-off power, which is generated in generator 69. The particular reference level is selected by an arrangement consisting of a single pulse generator 71, flip-flop 73 and an OR gate 75. 77 is a buffer which stores outputs of 65 passed on through 67. Generator 71 will provide an input pulse to the flip-flop 73 to change the output thereof from 1 to 0 or vice-versa. The output of the flip-flop will then set the gates 67 and 79 to Enable (H) or $\overline{\text{Enable}}$ (L) and the gate 81 will select the smaller output of 79 and 69.

79 is a gate/generator which, when set to Enable (H) will output a level equal to the limit 69, and, when set to e,ovs/Enable/ (L), will pass the stored output of 77 to 81. 67 is a gate which, when set to Enable (H), will pass the output of 65 to 77, and, when set to $\overline{\text{Enable}}$ (L), will block this output.

As can be seen, on turn-on, 67 and 79 are set at Enable (H), and the value stored in 79 is the same as the limit generated in 69. 77 is initially also set at this limit. With 67 set at Enable (H), the output of 65 will be passed to 77. 79, being set at Enable (H) will ignore the output of 77 and will output the limit. It is immaterial, therefore, whether 81 selects the output of 69 or 79 as both are at the same level.

As the flight proceeds, calculated values of power are passed on from 67 to 77 as 67 is set at Enable (H), and the levels are stored in 77. If the pilot decides to change the reference level to a level consistent with power level setting at which he is operating at a given time, he activates selection switch 33 at that time. This will activate 71 which will cause flip-flop 73 to flip so that 67 and 79 will both be set to $\overline{\text{Enable}}$ (L). The last value stored in 77 at that time will be selected by 79 because 67, being set at $\overline{\text{Enable}}$ (L) will stop transmitting output from 65. This value of 77, if lower than that of 69, will become the new reference level as 81 will now select the lesser of the values of 69 and 79. This selected value will remain the reference level until 33 is again activated, whereupon the reference level will revert to the generated limit of 69 since, when 33 is again activated, both 67 and 79 will be reset at Enable (H). It is to be noted that, as 81 selects the lower of 69 or 79, the reference level can never be set above the limit of 69.

If it is attempted to change the reference value in 79 to a computed power greater than the level of the permanent power limit unit 69, the reference value defaults to the permanent power limit unit 69. The override switch 34 which would be connected to the power lever in the pilot's cockpit, resets the reference value to the permanent power limit unit 69 level whenever maximum power setting is selected.

The appropriate reference value is then fed, through 81, to the negative terminal of summer 83 whose positive terminal is fed from the output of 65. The output of 83 is then fed to gate 85 which will pass only positive values, i.e., gate 85 has an output only when SHP is greater than the reference level. The output of 85 is then fed to a digital to analog converter 87, and the output analog signal of 87 is amplified in amplifier 89 which drives a solenoid driven pneumatic valve 91. The power limiter unit incorporates an exhaust orifice for the release of governing air pressure $P_y$ bleed. Movement of the solenoid driven valve will open the orifice to permit this pressure bleed. The exhaust orifice may be sized to limit the authority of the unit. A reduction of $P_y$ by this bleeding process will lead to a reduction in fuel flow.

The different signal will operate the control valve to reduce power until equilibrium is achieved, i.e., until SHP is equal to the reference level.

Figure 3:
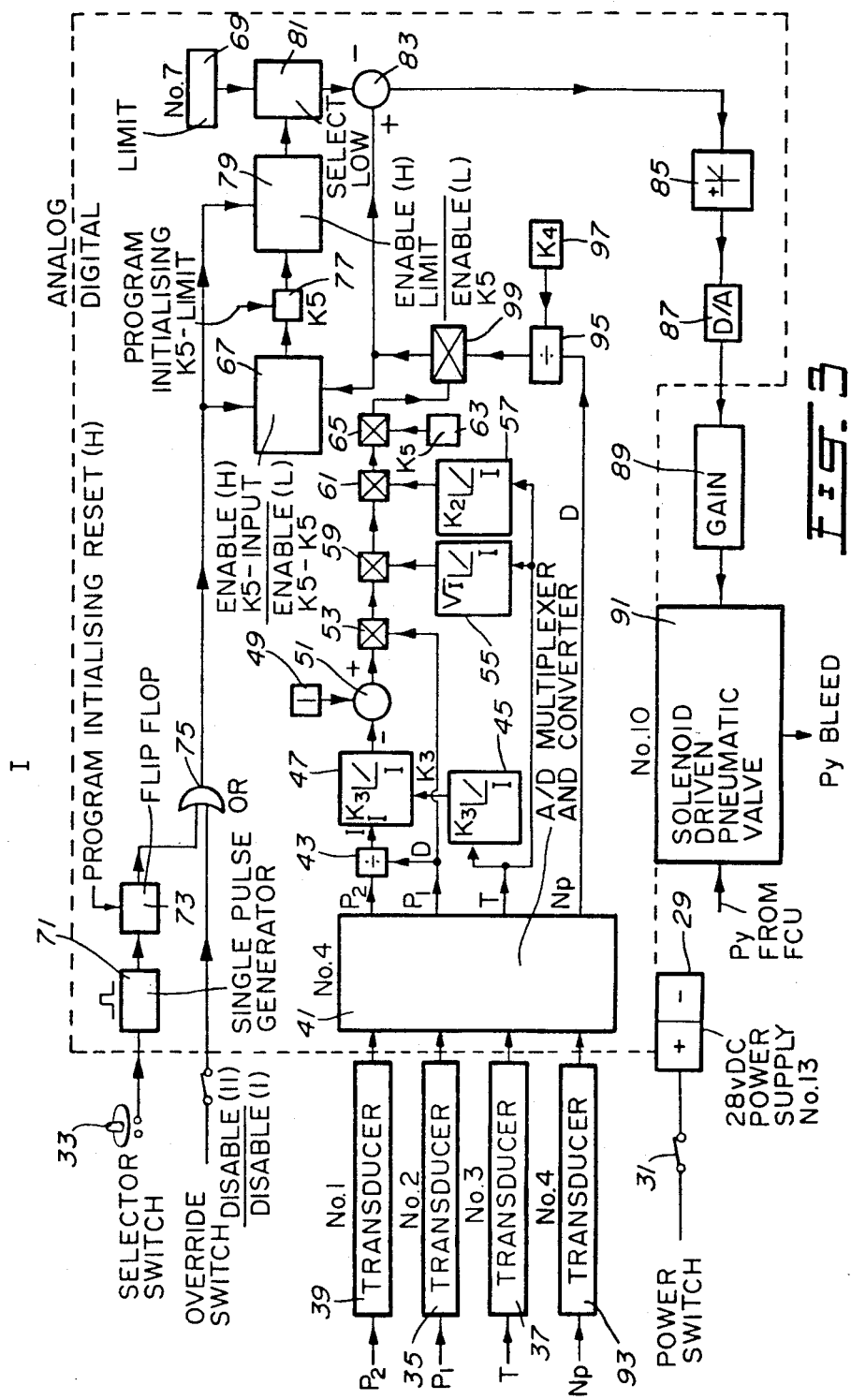
FIG. 3 illustrates, in block diagram form, an electronic system for performing the calculations and providing an output signal for torque limiting.

Torque is limited by using the arrangement as illustrated in FIG. 3. These elements of FIG. 3 comprise all the elements of FIG. 2 plus a transducer 93, a divider circuit 95, a K4 generator 97 and a multiplier 99. As will be clear, the output of 95 is K4/Np.

This value is multiplied, in multiplier 99, by SHP, to produce torque.

Although FIG. 3 illustrates an actual K4 generator, in practice, one would merely adjust the K1 value to take into account the K4 constant.

In operation, the arrangement works as follows:

The temperature and pressure values are measured as above described. This data is used to calculate SHP. If torque is to be calculated, then the RPM of the power turbine is also measured.

SHP or torque is then compared to a reference level which is either a set level or a level determined as a function of SHP or torque, and, if the calculated value is greater than the reference level, a fuel control unit reduces fuel to the engine until equilibrium is achieved, i.e., until the calculated value is equal to the reference level.

Although a single embodiment has been above described, this was for the purpose of illustrating but not limiting, the invention. Various modifications, which will come readily to the mind of one skilled in the art, are within the scope of the invention as defined in the appended claims.

I claim:

1. In a free turbine engine, which engine includes a power turbine having an inlet, an exhaust duct downstream of said turbine, an output shaft and a control valve for controlling engine power, the improvement comprising a power limit unit;

said unit comprising:
first sensor means for measuring pressure at said inlet, said first sensor means being disposed in said power turbine inlet;
second sensor means for measuring temperature at said inlet, said second sensor means being disposed in said turbine inlet;
third sensor means for measuring power turbine exhaust pressure, said third sensor means being disposed in said duct;
processor means for calculating shaft horse power (SHP) from the measurements of said first, second and third sensor means;
means for generating a reference signal;
comparator means, for comparing SHP with said reference signal, said comparator means having output means;
the output means being connected to said control valve;
whereby, to reduce engine power when SHP is greater than said reference signal.

2. A unit as defined in claim 1 wherein SHP is determined in accordance with the formula:

$$SHP = K1\, K2\, P1 \sqrt{T}\left(1 - \left(\frac{P2}{P1}\right)^{K3}\right)$$

wherein:
SHP = shaft horse power
P1 = pressure at the power turbine inlet
T = temperature at the power turbine inlet
P2 = Power turbine exhaust pressure
K1 = constant = $Q\eta_{pt}\,\eta_{mec}$
Q = power turbine flow parameter
$\eta_{pt}$ = efficiency of the power turbine
$\eta_{mec}$ = mechanical efficiency
K2 = Cp
Cp = specific heat of the gas
K3 = $(\gamma - 1/\gamma)$
$\gamma$ = ratio of specific heat of the gas.

3. A unit as defined in claim 2 wherein said first, second and third sensor means are connected, respectively, to the first, second and third transducers;
whereby to produce analog electrical signals representative of the measured quantities.

4. A unit as defined in claim 3 wherein the output of said transducers are connected to an analog to digital converter; and
wherein said processor means comprises digital processor means.

5. A unit as defined in claim 4 wherein said control valve bleeds fuel control unit governing pressure to reduce the pressure and thereby reduce fuel flow.

6. A unit as defined in claim 5 wherein said means for generating a reference signal comprises a first means for generating a preset level and a second means for generating a level which is related to power lever setting; and
means for selecting either said first means or said second means.

7. In a free turbine engine, which engine includes a power turbine having an inlet, an exhaust duct downstream of said power turbine, an output shaft and a control valve for controlling engine power, the improvement comprising a torque limit unit;

said unit comprising:
first sensor means for measuring pressure at said inlet, said first sensor means being disposed in said turbine inlet;
second sensor means for measuring temperature at said inlet, said second sensor means being disposed in said turbine inlet;
third sensor means for measuring turbine exhaust pressure, said third sensor means being disposed in said duct;
fourth sensor means for measuring RPM of said turbine;
processor means for calculating torque from the measurements of said first, second, third and fourth sensor means;
means for generating a reference signal;
comparator means, for comparing calculated torque with said reference signal, said comparator means having output means;
the output means being connected to said control valve;
whereby, to reduce engine torque when said calculated torque is greater than said reference signal.

8. A unit as defined in claim 7 wherein torque is determined in accordance with the formula:

$$\text{torque} = SHP \times \frac{K4}{N_p}$$

wherein:

$$SHP = K1\, K2\, P1 \sqrt{T}\left(1 - \left(\frac{P2}{P1}\right)^{K3}\right)$$

wherein:
SHP = shaft horse power
P1 = pressure at the power turbine inlet
T = temperature at the power turbine inlet
P2 = power turbine exhaust pressure
K1 = constant = $Q\eta_{pt}\,\eta_{mec}$
Q = power turbine flow parameter $\eta_{pt}$ = efficiency of the power turbine
$\eta_{mec}$ = mechanical efficiency
K2 = Cp
Cp = specific heat of the gas
K3 = $(\gamma - 1/\gamma)$
$\gamma$ = ratio of specific heat of the gas
K4 = constant
$N_p$ = RPM of the power turbine.

9. A unit as defined in claim 8 wherein said first, second, third and fourth sensor means are connected, respectively, to the first, second, third and fourth transducers;
   whereby to produce analog electrical signals representative of the measured quantities.

10. A unit as defined in claim 9 wherein the output of said transducers are connected to an analog to digital converter; and
    wherein said process or means comprises digital processor means.

11. A unit as defined in claim 10 wherein said control valve bleeds fuel control unit governing pressure to reduce the pressure and thereby reduce fuel flow.

12. A unit as defined in claim 11 wherein said means for generating a reference signal comprises a first means for generating a preset level and a second means for generating a level which is related to power lever setting; and
    means for selecting either said first means or said second means.

13. A unit as defined in claim 1 wherein the third sensor means measures ambient pressure to approximate power turbine exhaust pressure, third sensor means being disposed at a strategic location on the aircraft fuselage.

14. A unit as defined in claim 7 wherein the third sensor means measures ambient pressure to approximate power turbine exhaust pressure, third sensor means being disposed at a strategic location on the aircraft fuselage.

15. In a free turbine engine, which engine includes a power turbine having an inlet, an exhaust duct downstream of said turbine, an output shaft and a control valve for controlling engine output power, the improvement comprising a power limit unit, said unit comprising:
    first sensor means for measuring pressure at said inlet, said first sensor means being disposed in said power turbine inlet;
    second sensor means for measuring temperature at said inlet, said second sensor means being disposed in said turbine inlet;
    third sensor means for measuring power turbine exhaust pressure, said third sensor means being disposed in said duct;
    processor means for calculating a parameter representative of engine output power from the measurements of said first, second and third sensor means;
    means for generating a reference signal;
    comparator means for comparing said parameter representative of engine output power with said reference signal, said comparator means having output means;
    the output means being connected to said control valve, whereby engine power is reduced when said parameter representative of engine output power is greater than said reference signal.

* * * * *